United States Patent [19]
Iijima et al.

[11] Patent Number: 4,944,028
[45] Date of Patent: Jul. 24, 1990

[54] NON-CONTACT TYPE PATTERN SENSOR WITH VARIABLE CLEARANCE COMPENSATION

[75] Inventors: Kenzaburou Iijima; Yoshinori Hayashi, both of Hamamatsu; Kazuo Kurahashi, Hamatsu, all of Japan

[73] Assignee: Nippon Gakki Seizo Kabushiki Kaisha, Japan

[21] Appl. No.: 271,388

[22] Filed: Nov. 10, 1988

Related U.S. Application Data

[63] Continuation of Ser. No. 946,321, Dec. 24, 1986, abandoned.

[30] Foreign Application Priority Data

Dec. 28, 1985 [JP]  Japan ................ 60-299415
Mar. 5, 1986 [JP]   Japan ................ 61-47761
May 23, 1986 [JP]   Japan ................ 61-119838
May 26, 1986 [JP]   Japan ................ 61-120579

[51] Int. Cl.$^5$ ............................. G01B 7/14
[52] U.S. Cl. ..................... 324/207.12; 324/207.21; 324/225; 324/226; 324/661
[58] Field of Search ............. 324/207, 208, 225–228, 324/252, 262, 232–234, 60 R, 61 R, 61 P, 207.12, 207.21, 661, 662, 684; 338/32 R, 32 H

[56] References Cited

U.S. PATENT DOCUMENTS

| 3,716,782 | 2/1973 | Henry | 324/60 R X |
|---|---|---|---|
| 3,863,235 | 1/1975 | McKee et al. | 324/207 X |
| 3,961,243 | 6/1976 | Schulz | 324/208 |
| 4,103,222 | 7/1978 | Phillips et al. | 324/208 X |
| 4,215,310 | 7/1980 | Schwerer, III | 324/225 |
| 4,319,188 | 3/1982 | Ito et al. | 324/208 X |
| 4,387,601 | 6/1983 | Azegami | 324/60 R X |
| 4,518,919 | 5/1985 | Ishida | 324/235 X |
| 4,520,311 | 5/1985 | Petr et al. | 324/252 X |
| 4,525,668 | 6/1985 | Lienhard et al. | 324/252 X |
| 4,528,506 | 7/1985 | Davis et al. | 324/225 |
| 4,596,950 | 6/1986 | Lienhard et al. | 324/252 X |
| 4,596,953 | 6/1986 | Nagasaka et al. | 324/262 X |
| 4,641,092 | 2/1987 | Sakamoto et al. | 324/262 X |
| 4,672,317 | 6/1987 | Indo | 324/225 X |
| 4,677,377 | 6/1987 | Takahashi et al. | 324/252 X |
| 4,683,429 | 7/1987 | Popovic | 324/252 X |
| 4,727,322 | 2/1988 | Louchampt et al. | 324/207 X |
| 4,731,579 | 3/1988 | Petersen et al. | 324/207 |

Primary Examiner—Reinhard J. Eisenzopf
Assistant Examiner—Warren S. Edmonds
Attorney, Agent, or Firm—Ostrolenk, Faber, Gerb & Soffen

[57] ABSTRACT

An improved non-contact type pattern sensor includes a magnetic resistor element arranged facing a pattern track on a recoridng medium having a magnetized pattern in the pattern track. A clearance sensor is arranged to face the pattern track on the recording medium and generates a detection signal as a function of the distance between the clearance sensor and the pattern track. The control unit connected to the clearance sensor generates an output signal which varies as a function of the detection signal. A magnetic field generator connected to the control unit is arranged near the magnetic sensor element and generates a bias magnetic field whose intensity varies as a function of the output signal.

2 Claims, 7 Drawing Sheets

NON-CONTACT TYPE PATTERN SENSOR WITH VARIABLE CLEARANCE COMPENSATION

This is a continuation of application Ser. No. 946,321 filed on Dec. 24, 1986, now abandoned.

BACKGROUND OF THE INVENTION

The present invention relates to an improved non-contact type pattern sensor, and more particularly relates to improvement in construction of a pattern sensor such as a magnetic encoder in which one or more detecting elements such as magnetic resistor elements are arranged facing the pattern track on a recording medium such as a magnetic disc or tape.

In the case of such a non-contact type pattern sensor, the clearance between the pattern track on the recording medium and the detecting element tends to fluctuate due to low working and/or mounting precision of the recording medium as well as due to age warping of the recording medium after long use. Such fluctuation in clearance has a negative influence on the output of the sensor. In particular, the resulting distortion of the output wave shape and the variation in output level greatly lowers the SN ratio, degree of dissolution and precision in output.

In order to remove such negative influences resulting from fluctuations in clearance, a unique non-contact type pattern sensor has already been proposed. In the case of this pattern sensor, a pair of magnetic resistor elements are arranged side by side facing the lower face of a rotary recording media and a pair of magnetic resistor elements are arranged facing the upper face of the recording media also. These four magnetic resistor elements form a bridge circuit in combination with a pair of ordinary resistor elements. Drive voltage is applied to the input terminal and an output voltage is taken out from the output terminals. The sensor changes its resistance on detection of the pattern stored in the recording media. This sensor takes the form of a bridge circuit including a variating section made up of the magnetic resistor elements whose resistances change in response to the fluctuation in clearance and a constant section made up of the ordinary resistor elements of constant resistances.

It is assumed with this sensor that the resistances of the magnetic resistor elements at zero magnetic field is equal to R, the change in resistance corresponding to the maximum fluctuation in clearance is equal to $\Delta R_{max}$, the change in resistance caused by detection of the pattern on the recording medium is equal to $K_1$ and $K_2$, and the resistance of the ordinary resistor elements is equal to 2 R. When the lower side clearance is minimum and the upper side clearance is maximum, the resistance of one lower side magnetic resistor element is equal to $K_1(R+\Delta R_{max})$, the resistance of one upper side magnetic resistor element is equal to $K_1(R-\Delta R_{max})$, the resistance of the other lower side magnetic resistor element is equal to $K_2(R+\Delta R_{max})$ and resistance of the other upper side magnetic resistor element is equal to $K_2(R-\Delta R_{max})$.

When the maximum degree of resistance change by detection of the stored pattern is 4%, $K_1$ is equal to 1.04 and $K_2$ is equal to 0.96. Then the voltage $V_1$ between the one lower and upper magnetic elements and the voltage $V_2$ between the other lower and upper magnetic elements are given by the following equation:

$$V_1 = 2.08R \cdot V/4R = 0.52V$$

$$V_2 = 2R \cdot V/4R = 0.5V$$

Then, the voltage $V_{out}$ between the output terminals of the bridge circuit is given by the following equation:

$$V_{out} = V_1 - V_2 = 0.02V$$

From the foregoing, it is clear that the output of this early proposed sensor is dependent on the voltage only without any influence by the clearance. Despite this merit, the sensor requires use of ordinary resistor elements as outer components and the low output voltage (0.02 V) causes SN ratio problem.

SUMMARY OF THE INVENTION

It is the basic object of the present invention to completely remove the above-described detrimental influence on the output of a non-contact type pattern sensor due to fluctuations in the clearance between the read head and the record medium without using any outer components.

In accordance with a first aspect of the present invention, a non-contact type pattern sensor comprises a detecting element arranged facing the pattern track on a recording medium, means for generating a clearance signal corresponding to an instantaneous clearance between the pattern track and the detecting element, and control means for compensating an output signal of the sensor in response to the clearance signal from the generating means.

In accordance with a second aspect of the present invention, a non-contact type pattern sensor comprises at least a pair of detecting elements arranged facing the pattern track on a recording medium, and control means for compensating an output signal of the sensor in response to detection signals from the detecting elements.

DESCRIPTION OF THE PREFERRED EMBODIMENT

Figure 1:
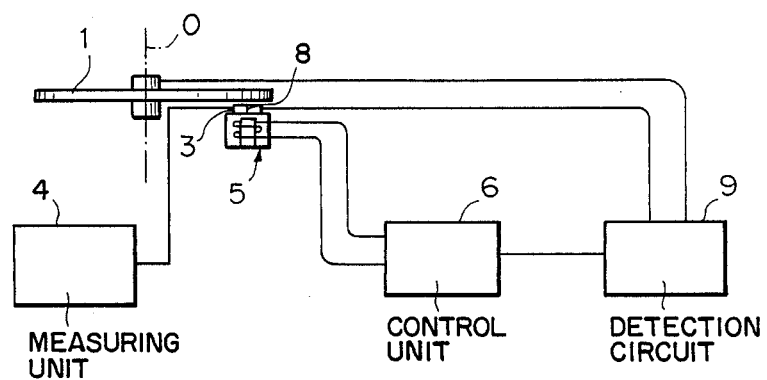
FIG. 1 is a schematic side view of one embodiment of the non-contact type pattern sensor in accordance with a first aspect of the present invention with certain components being partially hidden from view.
Figure 2:
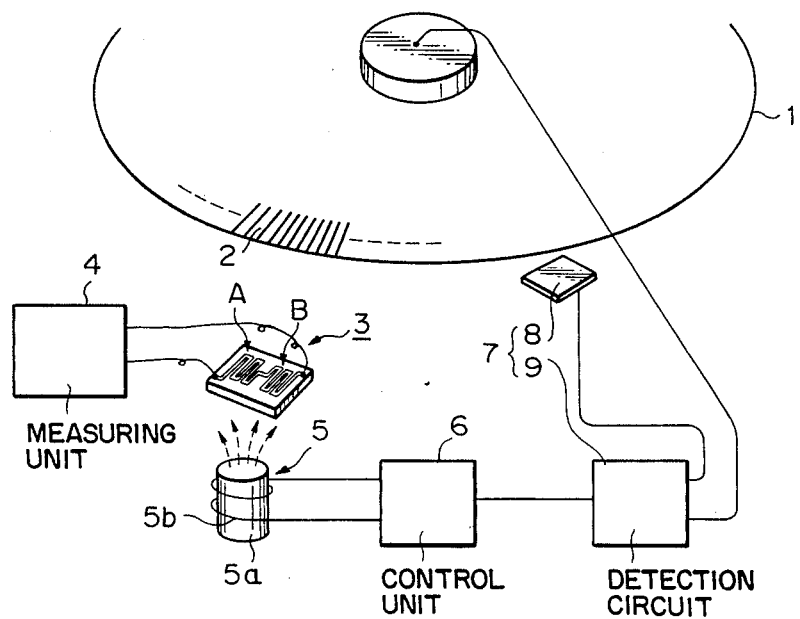
FIG. 2 is a simplified perspective view for showing the outline construction of the pattern sensor shown in FIG. 1.

One embodiment of the non-contact type pattern sensor in accordance with the first aspect of the present invention is shown in FIGS. 1 and 2, in which the sensor takes the form of a magnetic encoder which generates sine wave output signals and a biased magnetic field is applied to the detecting element for compensation of the sensor output. The recording medium 1 takes the form of a circular disc rotatable about its center axis 0. Magnetized patterns 2 are formed on the recording medium 1 by a sine wave signal. A magnetic resistor element 3 is spaced from but closely faces the magnetized pattern 2 on the recording medium 1. As the recording medium 1 rotates, magnetic resistor element 3 periodically changes its resistance in response to the periodically changing magnetic field generated by the magnetized pattern 2 on the recording medium 1. In the case of this embodiment, the magnetic resistor element 3 includes two patterns A and B having a phase lag of 90° with respect to the magnetized pattern 2 on the recording medium 1. This change in resistance of the magnetic resistor element 3 is picked up by a measuring unit 4 which generates a required sine wave output depending on the periodic change in resistance of the magnetic resistor element 3.

A magnetic field generator 5 is arranged spaced from but facing the magnetic resistor element 3 in order to apply an uniform bias magnetic field to the entire magnetic resistor element 3. In the case of the illustrated embodiment, this magnetic field generator 5 is made up of a core 5a and a coil 5b wound about the core 5a. A control unit 6 is connected to the magnetic field generator 5 in order to adjust the intensity of the magnetic field to be generated by its output current to be passed to the coil 5b. As later described in more detail, the control unit 6 is connected to a clearance sensor 7 (partially hidden behind resistor element 3 in FIG. 1) and varies the magnitude of its output current in response to the detection signal from the clearance sensor 7.

The clearance sensor 7 detects instantaneous clearance between the magnetized pattern 2 on the recording medium and the face of the magnetic resistor element 3 in order to pass a corresponding detection signal to the control unit 6. In the case of the illustrated embodiment, an electrostatic capacity type sensor is used. That is, the clearance sensor 7 includes a metal plate 8 arranged at a constant distance from the magnetic resistor element 3 and a detection circuit 9 connected to the metal plate 8, the recording medium 1 and the control unit 6. Thus the electrostatic capacity between the metal plate 8 and the recording medium 1 varies depending on the clearance between them and instantaneous clearance is detected through measurement of the electrostatic capacity. As long as the distance between the magnetic resistor element 3 and the metal plate 8 is kept constant, they may be arranged separately from each other.

The operation of the circuit will now be explained. A periodically changing magnetic field is applied to the magnetic resistor element 3 by the magnetized pattern 2 on the recording medium 1 which is rotated and a corresponding change in the resistance of the magnetic resistor element 3 is picked up by the measuring unit 4 for generation of the required sine wave output.

Fluctuations in clearance between the recording medium 1 and the magnetic resistor element 3 change the influence of the magnetic field produced by the magnetized pattern 2 on the magnetic resistor element 3, thereby cauisng undesirable distortions of the output wave shape.

In the case of this embodiment, the magnetic field generator 5 applies a bias magnetic field to the magnetic resistor element 3, which corresponds to the instantaneous size of the clearance. More specifically, the size of the clearance between the recording medium 1 and the magnetic resistor element 3 is detected by the clearance sensor 7 through measurement of the electrostatic capacity and the control unit 6 adjusts the magnitude of the current to be passed to the magnetic field generator 5 in response to the detection signal from the clearance sensor 7, thereby adjusting the intensity of the bias magnetic field generated by the magnetic field generator 5. In this adjustment, the intensity of the bias magnetic is made larger as the clearance increases so that any distortions of the output wave shape should be compensated for That is, the magnitude of the current to be passed to the coil 5b is adjusted so that the degree of distortion should be minimized over the entire range of the sine wave. As a consequence, the measuring unit 4 can issue a constant sine wave without any distortion in the wave shape due to variations in the distance from the pattern 2 to the resistor element 3.

In one actual example, a magnetic resistor element of 5 kΩ was formed of a Ni-Fe alloy and the output bias magnetic field by the magnetic field generator was adjusted in a range from 10 to 18 G corresponding to clearance fluctuation in a range from 5 to 10 μm. A bias magnetic field of 18 G was employed for 5 μm clearance, and a bias magnetic field of 10 G was for 10 μm clearance.

The degree of distortion for the 5 μm clearance was 4% (1 kHz) and that for the 10 μm clearance 6% (1 kHz). The output sine wave was substantially free of negative influences resulting from clearance fluctuations.

When no adjustment by the bias magnetic field was employed, the degree of distortion for the 5 μm clearance was 32% (1 kHz) and that for the 10 μm clearance 5% (1 kHz). No stable output of sine wave could be attained.

When the degree of distortion can be satisfactorily reduced using a constant bias magnetic field, a permanent magnet may be used for the magnetic field generator 5. Alternatively, current of a constant magnitude may be applied to the coil 5b.

Figure 3:
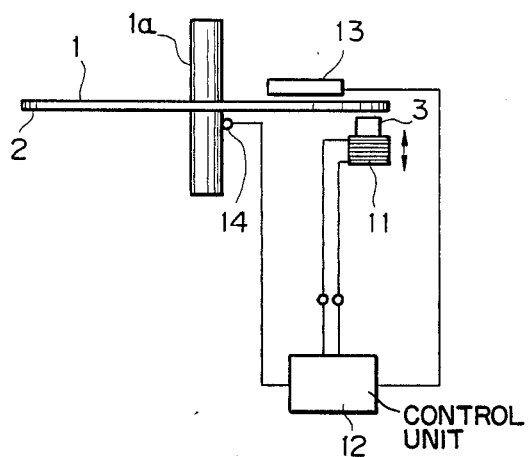
FIG. 3 is a block diagram of another embodiment of the non-contact type pattern sensor in accordance with the first aspect of the present invention.

Another embodiment of the non-contact type pattern sensor in accordance with the first aspect of the present invention is shown in FIG. 3, in which the sensor takes the form of a magnetic encoder which generates sine wave output signals and the position of the detecting element is adjusted to adjust the sensor output 1. The recording medium 1 takes the form of a circular disc mounted to a central rotary shaft 1a. A magnetized pattern is formed on the recording medium 1 by a sine wave. Spaced from but closely facing a magnetized pattern 2 on the recording medium 1 is arranged a magnetic resistor element 3 which, as the recording medium 1 rotates, periodically changes its resistance under the influence of the periodically changing magnetic field generated by the magnetized pattern 2 on the recording medium 1.

The magnetic resistor element 3 is mounted on a piezo-electric element 11 which is connected to a control unit 12. The piezo-electric element 11 moves the magnetic resistor element 3 towards any away from the magnetized pattern 2 on the recording medium 1 in response to the voltage applied by the control unit 12. The piezo-electric element 11 has an integrated construction including, for example, 10 layers. The control unit 12 is connected to a fixed electrode 13 spaced from and facing the top surface of the recording medium 1, and an electrode 14 arranged in contact with the rotary shaft 1a of the recording medium 1. The control unit 12 detects the electrostatic capacity between the two electrodes 13 and 14 and adjusts the voltage to be applied to the piezo-electric element 11 in accordance therewith.

The electrostatic capacity between the electrodes 13 and 14 varies in response to fluctuations in the clearance between the fixed electrode 13 and the top surface of the recording medium 1. These fluctuations in clearance are representative of fluctuations in clearance between the magnetic resistor element 3 and the magentized pattern 2 on the recording medium 1. The control unit 12 automatically adjusts the voltage to be applied to the piezo-electric element 11 so that the clearance between the magnetic resistor element 3 and the magnetized pattern 2 on the recording medium 1 is maintained substantially constant. The clearance is kept within a range from 2 to 5 μm. In one actual example, this range of fluctuation resulted in 4% maximum distortion with 3% maximum amplitude variation. When no adjustment was employed, 13% maximum distortion with 20% maximum amplitude variation was measured.

Figure 4:
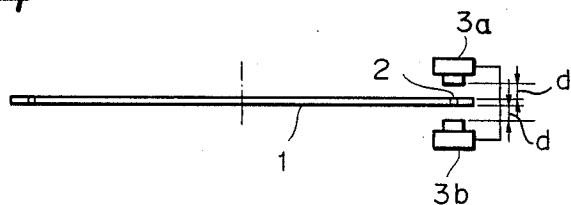
FIG. 4 is a side view of the basic construction of the non-contact type pattern sensor in accordance with a second aspect of the present invention.

The basic construction of the non-contact type pattern sensor in accordance with the second aspect of the present invention is shown in FIG. 4. Here again the sensor takes the form of a magnetic encoder which generates a sine wave output signal and the recording medium 1 takes the form of a circular disc. Magnetized patterns 2 are formed on the recording medium 1 by a sine wave.

FIG. 4, a pair of magnetic resistor elements 3a and 3b (the detecting elements) are arranged spaced from and facing the top and bottom surfaces of the recording medium 1 at a position equally spaced from the recording medium and are connected to one another in such a manner that the electric outputs from the magnetic resistor elements are combined.

When the clearances between the recording medium 1 and the magnetic resistor elements 3a, 3b fluctuate with this construction, the electric outputs from the magnetic resistor elements 3a and 3b include respective electric fluctuations corresponding to the associated fluctuations in clearance and, due to opposite polarity of the electric fluctuations, the electric fluctuations offset each other. As a consequence, despite the presence of real fluctuations in clearance, the combined output of the system includes no substantial fluctuation and there is a correct detection of the magnetized pattern 2 on the recording medium 1.

Preciseness of detection can be surprisingly raised increased when two or more pairs of detecting elements are arranged facing the top and bottom surfaces of the recording medium 1 and detecting elements of similar phase on both sides are connected in series to form one side of a bridge circuit.

Figure 5:
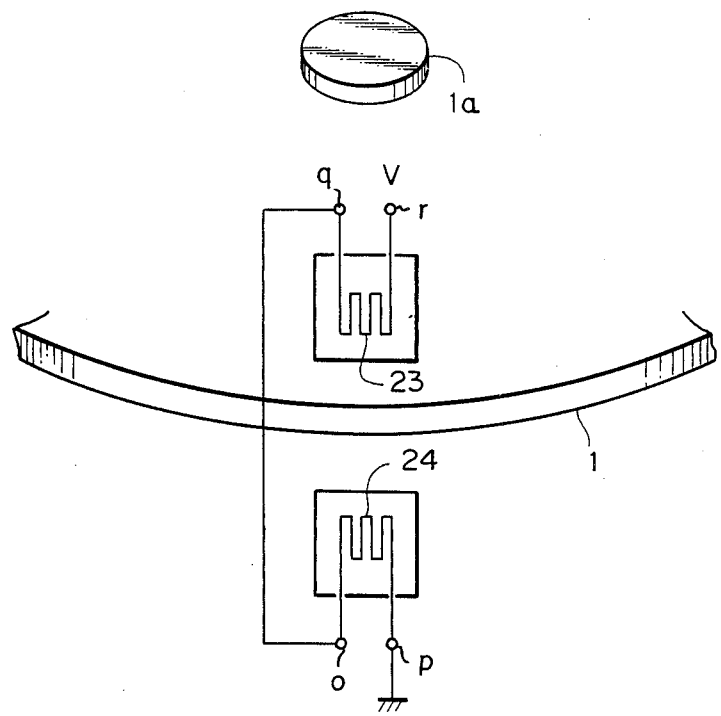
FIG. 5 is a perspective view of one embodiment of the non-contact type pattern sensor having the basic construction shown in FIG. 4.

One embodiment of the non-contact type pattern sensor of such a basic construction is shown in FIG. 5.

At a horizontal position equally spaced from the recording medium 1, a pair of magnetic resistor elements 23 and 24 (detecting elements) are arranged spaced from and facing the top and bottom surfaces of the recording medium 1 mounted on the center rotary shaft 1a. When no warp is present on the recording medium 1, the clearance between the top side magnetic resistor element 23 and the top surface of the recording medium 1 is set equal to that between the bottom side magnetic resistor element 24 and the bottom surface of the recording medium 1. One terminal "0" of the bottom side magnetic resistor element 24 is electrically connected to one terminal "q" of the top side magnetic resistor element 23 to form a series connected between the magnetic resistor elements 23 and 24 and a constant voltage V is applied to between the other terminals "r" and "p" of the top and bottom sides magnetic resistor elements 23 and 24.

Figure 6:
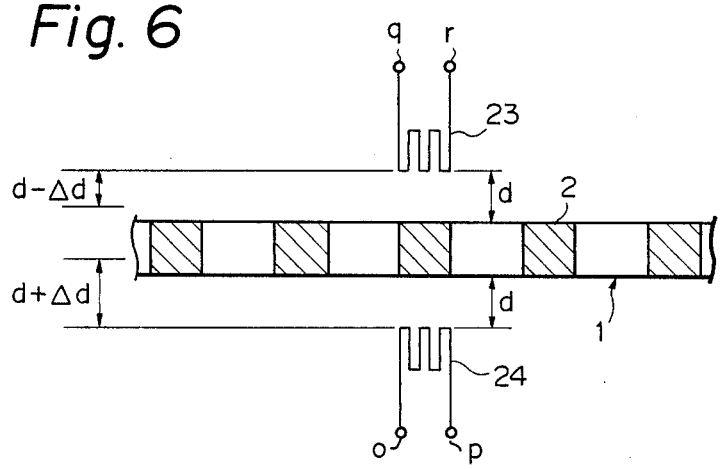
FIG. 6 is a schematic view for showing clearances between the detecting elements and the recording medium on the pattern sensor shown in FIG. 5.
Figure 7:
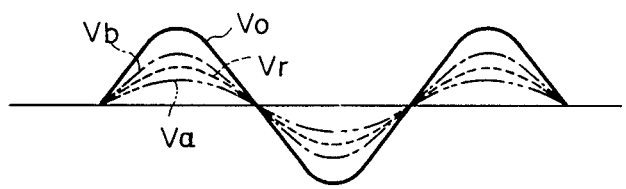
FIG. 7 is a graph for showing the detected output of the pattern sensor shown in FIG. 5.

When the magnetic resistor elements 23 and 24 have equal clearances with respect to the associated surfaces of the recording medium 1 as shown in FIG. 6, the resistances of the magnetic resistor elements 23 and 24 change depending on the magnetized pattern 2, which is detected on the basis of such resistance changes. When degree of change in resistance of the magnetic resistor elements 23, 24 is equal to ±4% and their resistances are equal to R with absence of magnetic field by the magnetized pattern 2, degree of change in resistance is in a range from 0.96 R to 1.04 R. Detected output is given in the form of a combination of such a change in resistance. As a consequence, when the detected output is equal to Vr corresponding to the change in resistance R of the magnetic resistor elements 23, 24 as shown in FIG. 7, the corresponding change in resistance of the combined output is equal to $V_o(=2 Vr)$.

The clearances between the recording medium 1 and the magnetic resistor elements 23, 24 fluctuate due to low manufacturing precision and/or warping of the recording medium 1. More specifically, it is assumed that the top side clearance decreased by Δ d and the bottom side clearance increased by Δ d. Then, the resulting top side clearance becomes equal to (d−Δ d) whereas the resulting bottom side clearance becomes equal to (d+Δ d). When change in resistance of the magnetic resistor elements 23 and 24 corresponding to the maximum fluctuation in clearance Δ $d_{max}$ is equal to Δ $R_{max}$ and the degree of change in resistance detected from the magnetized pattern 2 is equal to ±4%, change in resistance of the bottom side magnetic resistor element 24 is in a range from 0.96(R−Δ $R_{max}$) to 1.04(R−Δ $R_{max}$). Whereas change in resistance of the top side magnetic resistor element 23 is in a range from 0.96(R+ΔR$_{max}$) to 1.04(R+ΔR$_{max}$). When combined, the change in resistance offset and the output of the system is placed out of any influence by fluctuation in clearance. In FIG. 7, V$_a$ indicates the output of the bottom side magnetic resistor element 24, V$_p$ indicates the output of the top side magnetic resistor element 23, and V$_o$ indicates the combined output of the system. It is clearly seen that the combined output has a constant amplitude as in the case of no fluctuation in clearance.

Figure 8:
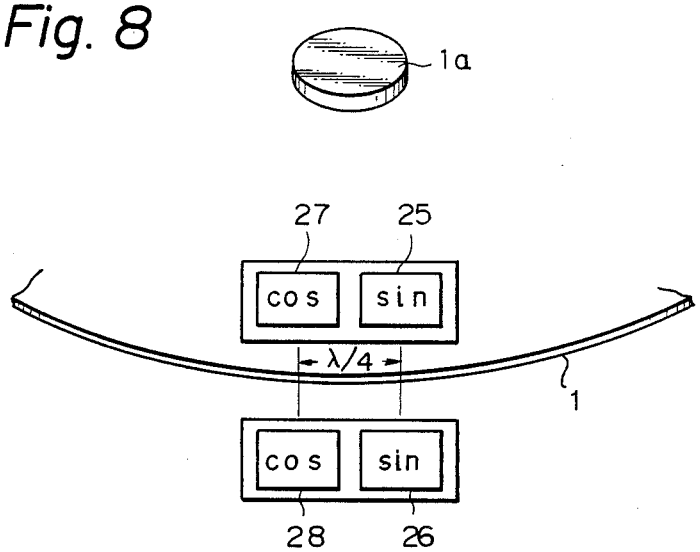
FIG. 8 is a perspective view of another embodiment of the non-contact type pattern sensor having the basic construction shown in FIG. 4.

Another embodiment of the non-contact type pattern sensor of the above-described basic construction is shown in FIG. 8, in which two pairs of detecting element units are used with each unit being at a horizontal position equally spaced from the recording medium. More specifically, one pair includes detecting element units 25 and 26 spaced from and facing the top and bottom surfaces of the recording medium 1 with equal clearance and the other pair includes detecting element units 27 and 28 arranged in a same way. When the sine wave output selected from the magnetized pattern 2 has a wavelength λ, the two pairs are horizontally spaced apart by a distance λ/4. Consequently, the detecting element units 25 and 26 operate for sine detection whereas the detecting element units 27 and 28 operate for cosine detection.

Figure 9:
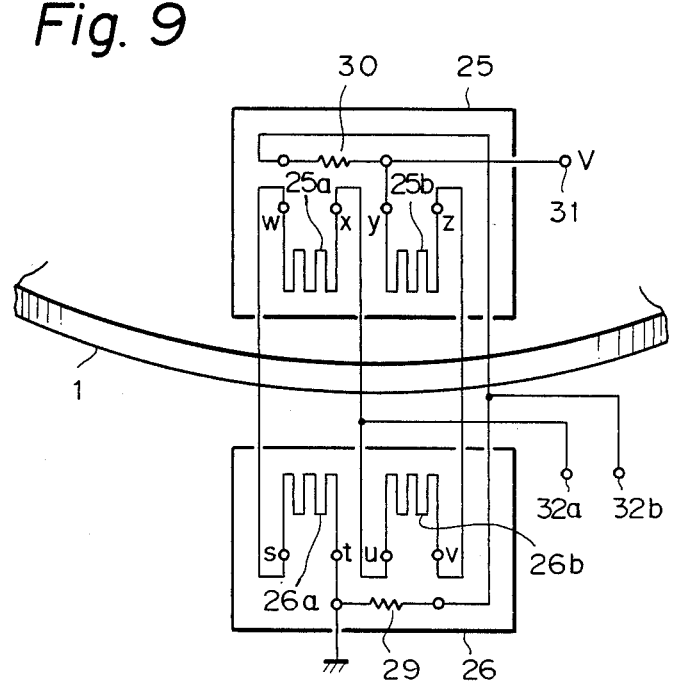
FIG. 9 is a detailed perspective view of the main part of the pattern sensor shown in FIG. 8.

One example of the pair of the detecting element unit is shown in FIG. 9. Although the detecting element units 25 and 26 are shown in the illustration, the detecting element units 27 and 28 also have a similar construction. The detecting element unit 25 is made up of a pair of magnetic resistor elements 25a, 25b and the detecting element unit 26 is made up of a pair of magnetic resistor elements 26a, 26b. The magnetic resistor elements 25a and 26a are located at an equally spaced horizontal position and connected to each other in series. The magnetic resistor elements 25b and 26b are located at an equally spaced horizontal position and connected to each other in series. Ordinary resistor elements 29 and 30 are also connected to form a bridge circuit shown in FIG. 10. When drive voltage V is applied to one terminal 31 of the circuit, output is obtained at output terminals 32a and 32b.

Figure 11:
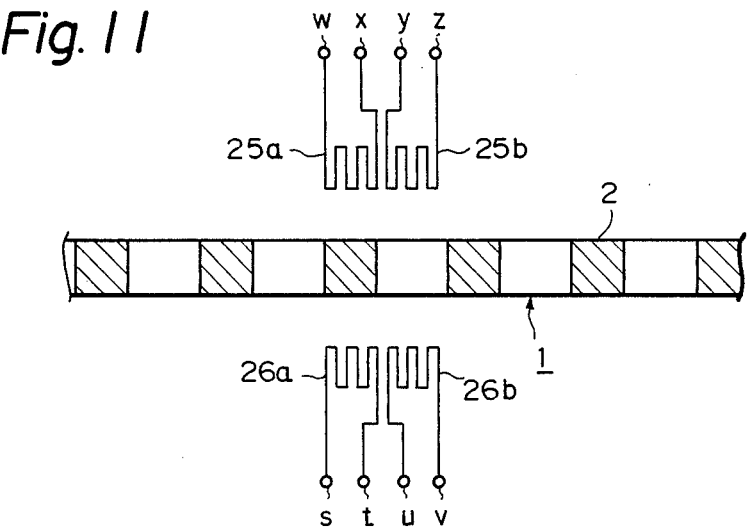
FIG. 11 is a schematic view of the arrangement of the magnetic resistor elements of the pattern sensor shown in FIG. 9.
Figure 12:
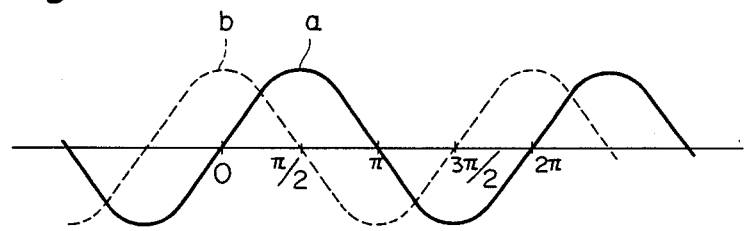
FIG. 12 is a graph of outputs resulted from the arrangement of the magnetic resistor elements shown in FIG. 11.

As described above, the magnetic resistor elements 26a and 26b as well as the magnetic resistor elements 25a and 25b are spaced apart by distances equal to λ/4 as shown in FIG. 11, respectively. In FIG. 12, a curve "a" indicates the output by the magnetic resistor elements 26a and 25a whereas a curve "b" indicates the output by the magnetic resistor elements 26b and 25b.

When the resistances of the magnetic resistor elements 25a, 25b, 26a and 26b are equal to R, the change in resistance corresponding to the maximum fluctuation in clearance is equal to R$_{max}$, degree of change in resistance detected from the magnetic pattern 2 is equal to ±4%, the resistances of the resistor elements 29 and 30 are equal to 2 R, the magnetic resistor elements 26a and 26b have the minimum clearance and the magnetic resistor elements 25a and 25b have the maximum clearance with no magnetic field by the magnetized pattern 2, the resistance of the magnetic resistor element 25a is equal to 1.04(R+ΔR$_{max}$), that of the magnetic resistor element 25b is equal to 0.96(R+R$_{max}$), that of the magnetic resistor element 26a is equal to 1.04(R−R$_{max}$) and that of the magnetic resistor element 26b is equal to 0.96(R−R$_{max}$).

When the voltage generated between the magnetic resistor elements 25a and 26a is equal to V$_1$ and the voltage generated at the terminals of the resistor element 29 is equal to V$_2$, the voltages V$_1$ and V$_2$ are given by the following equations.

$$V_1 = 2.08 \cdot V/4R = 0.52V$$

$$V_2 = 2R \cdot V/4R = 0.5V$$

Then, the voltage V$_{out}$ generated between the output terminals 32a and 32b is given in the form of the difference between the voltages V$_1$ and V$_2$ and equal to 0.02 V. It is now clear that the output voltage V$_{out}$ is swayed by the input voltage V only without any fluctuation in clearance at all.

Figure 10:
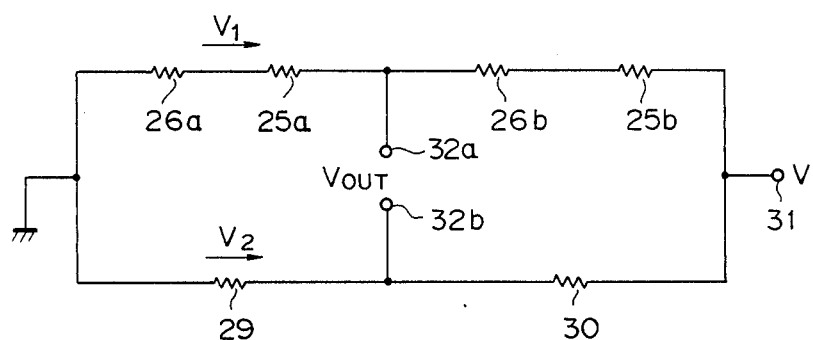
FIG. 10 is one circuit diagram of the construction shown in FIG. 9.

In the case of the bridge circuit shown in FIG. 10, the one magnetic resistor element 25a of the top side detecting element unit 25 and the one magnetic resistor element 26a of the bottom side detecting element unit 26 form, in a series connection, the first side of the bridge circuit, the other magnetic element 25b of the top side detecting element unit 25 and the other magnetic resistor element 26b of the bottom side detecting element unit 26 form, in a series connection, the second side of the bridge circuit which is next to the first side, the one ordinary resistor element 29 forms the third side of the bridge circuit which is opposite to the first side and the other ordinary resistor element 30 forms the fourth side of the bridge circuit which is opposite to the second side.

Figure 13:
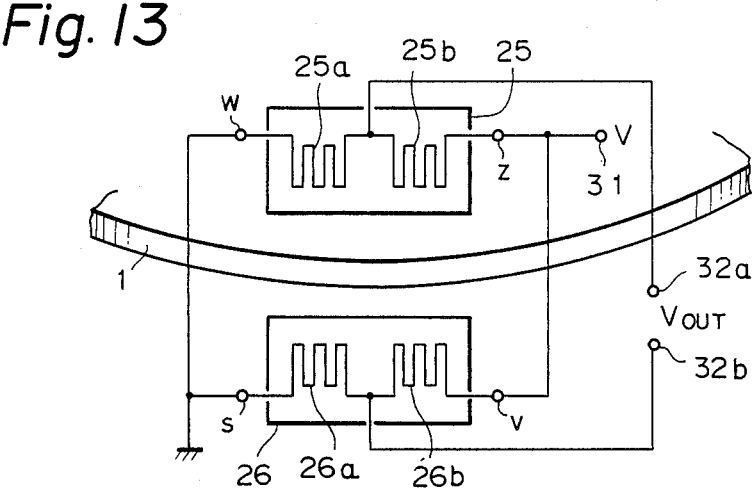
FIG. 13 is a detailed perspective view of the main part of the pattern sensor in accordance with the second aspect of the present invention.
Figure 14:
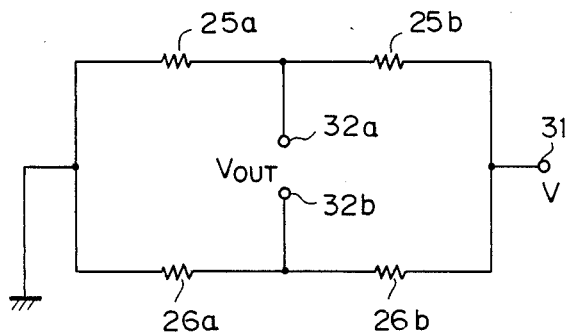
FIG. 14 is another circuit diagram of the construction shown in FIG. 9.

The other embodiment of the pattern sensor in accordance with the second aspect of the present invention is shown in FIG. 13. In this case the magnetic resistor elements 25a, 25b, 26a and 26b again form a bridge circuit such as shown in FIG. 14. With absence of the ordinary resistor elements, each magnetic resistor element forms each side of said bridge circuit. Here again the magnetic resistor elements in a common detecting element are horizontally spaced apart by a distance λ/4.

In the case of the pattern sensors in accordance with the second aspect of the present invention. Hall elements, piezoelectric elements, electrostatic capacity detecting elements and photo-electric elements may also be used for the detecting elements.

Figure 17:
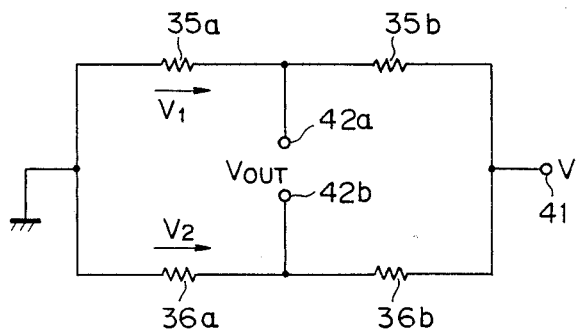
FIG. 17 is a circuit diagram of the construction shown in FIG. 15.
Figure 15:
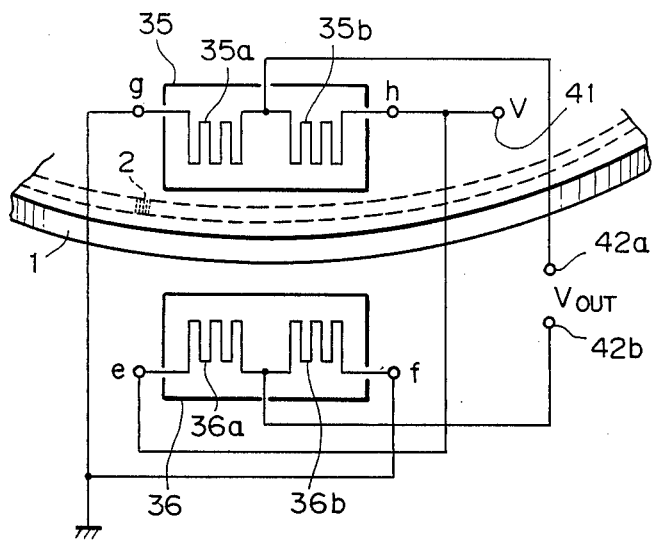
FIG. 15 is a perspective view of the other embodiment of the pattern sensor in accordance with the second aspect of the present invention.
Figure 16:
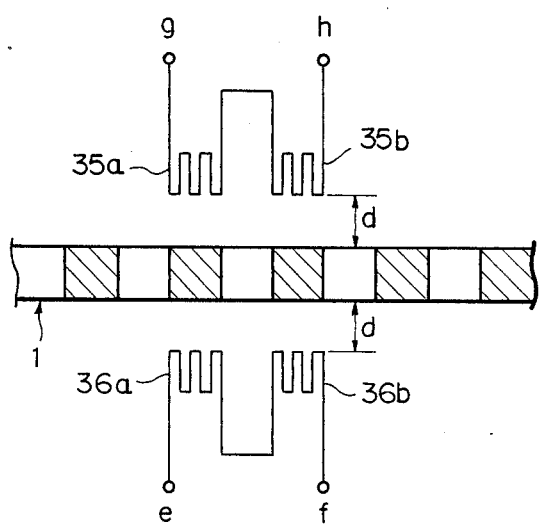
FIG. 16 is a schematic view of the arrangement of the magnetic resistor elements of the pattern sensor shown in FIG. 15.

The other embodiment of the pattern sensor in accordance with the second aspect of the present invention is shown in FIGS. 15 and 16, in which the pattern sensor includes a pair of detecting element units 35 and 36 arranged the top and bottom surfaces of the recording medium 1 with equally spaced clearance and at an equally spaced horizontal position. The top side detecting element unit 35 includes two magnetic resistor elements 35a and 35b which are horizontally spaced apart by a distance λ/4. The bottom side detecting element unit 36 also includes two magnetic resistor elements 36a and 36b which are horizontally spaced apart by a distance λ/4. The magnetic resistor elements 35a and 36a are located at an equally spaced horizontal position and connected to each other in series. The magnetic resistor elements 35b and 36b are located at an equally spaced horizontal position and connected to each other in series. Thus a bridge circuit shown in FIG. 17 is formed in which each magnetic resistor element forms each side of the bridge circuit. When voltage V is applied to an input terminal 41, output voltage V$_{out}$ is generated between output terminals 42a and 42b of the bridge circuit.

When the resistances of the magnetic resistor elements 35a, 35b, 36a and 36b are equal to R, change in resistance corresponding to the maximum fluctuation in clearance is equal to $\Delta R_{max}$, changes in resistance by detection of the magnetized pattern 1 are equal to $K_1$ and $K_2$ and the bottom side magnetic resistor elements 36a and 36b have the maximum clearance and the top side magnetic resistor element 35a and 35b have the minimum clearance, the resistance of the magnetic resistor element 36a is equal to $K_1(R-\Delta R_{max})$, that of the magnetic resistor element 36b is equal to $K_2(R-\Delta R_{max})$, that of the magnetic resistor element 35a is equal to $K_1(R+\Delta R_{max})$ and that of the magnetic resistor element 35b is equal to $K_2(R+R_{max})$.

When voltage $V_1$ is generated between terminals of the magnetic resistor element 36a and voltage $V_2$ is generated between terminals of the magnetic resistor element 35b, the voltages $V_1$ and $V_2$ are given by the following equations.

$$V_1 = K_1 \cdot V/(K_1+K_2)$$

$$V_2 = K_2 \cdot V/(K_1+K_2)$$

When the maximum degree of change in resistance is equal to $\pm 4\%$, $K_1$ is equal to 1.04, $K_2$ is equal to 0.96, $V_1$ is equal to $V/0.96$ and $V_2$ is equal to $V/1.04$. Then the output voltage $V_{out}$ is given by the following equation.

$$V_{out} = V_1 - V_2 = V/0.96 - V/1.04 \approx 0.08V$$

It is clear from this result that the output of the system is not influenced by fluctuation in clearance at all.

We claim:

1. An improved non-contact type pattern sensor, comprising:
   a magnetic resistor element arranged facing a pattern track on a recording medium having a magnetized pattern in said pattern track and having a resistance which varies as a function of a magnetic field of a facing portion of said pattern track;
   a clearance sensor arranged near said recording medium and generating a detection signal indicative of the distance between said clearance sensor and said recording medium;
   a control unit connected to said clearance sensor and generating an output signal in response to said detection signal; and
   a piezo-electric element connected to said control unit and holding said magnetic resistor element, said piezo-electric element moving said magnetic resistor element towards and away from said magnetized pattern on said recording medium as a function of said output voltage.

2. An improved non-contact type pattern sensor as claimed in claim 1 in which:
   said clearance sensor includes a first electrode spaced from and facing the top surface of said recording medium, and a second electrode arranged in contact with a center rotary shaft of said recording medium, and
   said control means measures the electrostatic capacity between said first and second electrodes.

* * * * *